March 3, 1953
N. L. MAHLA
2,629,897
EJECTOR
Filed July 2, 1949
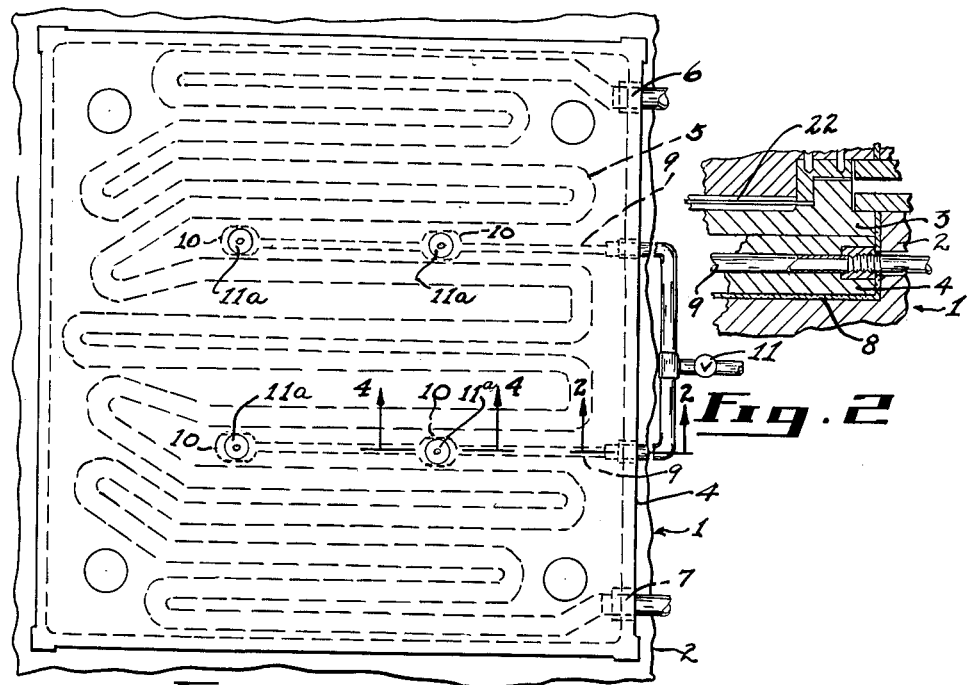
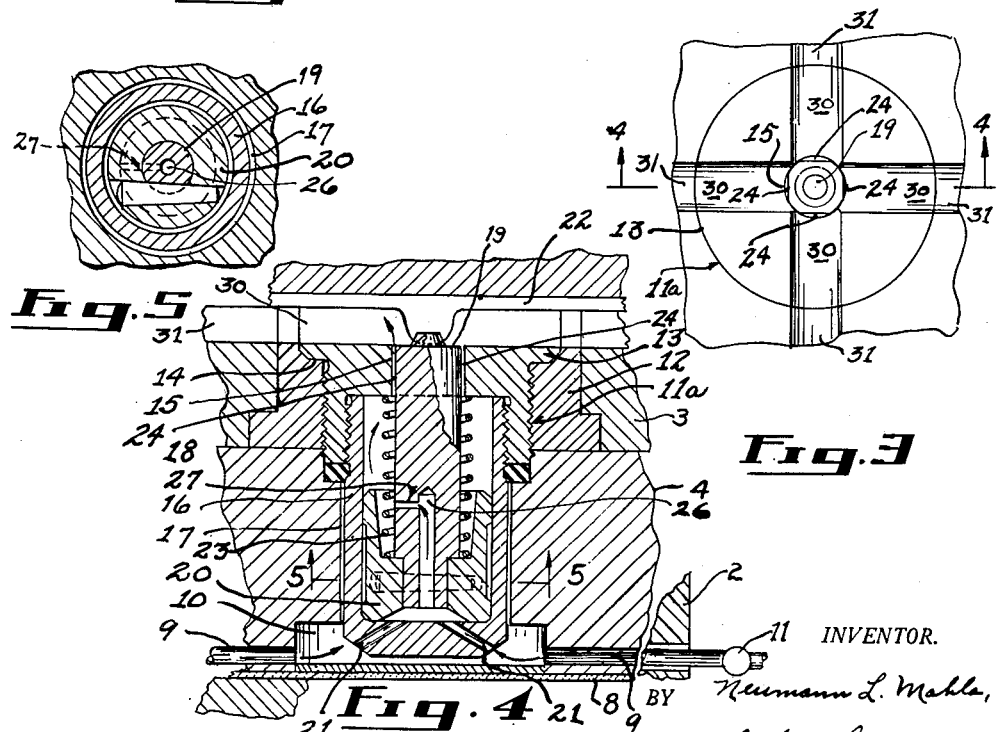
INVENTOR.
Neumann L. Mahla,
Gehr & Leonard,
his attys.

Patented Mar. 3, 1953

2,629,897

UNITED STATES PATENT OFFICE 2,629,897

EJECTOR

Neumann L. Mahla, Lakewood, Ohio

Application July 2, 1949, Serial No. 102,870

8 Claims. (Cl. 18—2)

This invention relates to an ejector for molds and to a mold and ejector combination, and particularly to an ejector for ejecting thermoplastic and thermosetting articles from the mold cavity.

Heretofore in molds for this purpose the practice has been to use ejectors which are operated by fluid pressure or linkage applied to a single large plate or carrier on which are rigidly mounted a plurality of ejecting pins, the plate being located outside of the mold and the mold sections with which the ejectors cooperate being provided with a plurality of holes which extend from the outside of the mold into cavities and through which the pins are simultaneously moved by the plate or carrier. The molds of assemblies of this type are very large and thick-walled and their manufacture involves a large amount of machining. Furthermore, they require complete removal of the mold from the press for servicing.

The present invention relates to a fluid pressure operated ejector unit which is self-contained and adapted to be detachably secured in the mold so as to be capable of installation and removal through the mold cavity without disassembly of the mold or its removal from the press, which is operable to eject the formed article by the concurrent application of force mechanically by engagement therewith and pneumatically or hydraulically by the introduction of air or liquid between the article and the mold cavity adjacent the ejector, and which is operative to vent the mold cavity adjacent the ejector so as to permit the discharge of evolved gases therefrom. For convenience, the ejector of the present invention is employing air as the operating pressure fluid, it being understood that other gases or liquids may be used instead of air.

For the purposes of illustration, the ejector is shown in connection with a mold of the general character shown and described in my copending application Serial No. 102,869, filed July 2, 1949, and in a form which is removable through the die cavity, its use in connection with other molds and in a form in which it can be removed from the die from the outside being readily apparent from the illustrative example.

The principal object of the present invention is to provide a mold and ejector combination in which the ejecting means is operative to eject the article by mechanical engagement and by progressively more widely distributed pneumatic pressure applied concurrently with the mechanical engagement.

Another object is to provide an ejector unit capable of venting evolved gases from the mold cavity.

Another object is to provide an ejector unit which is substantially self-contained and can readily be installed in a mold section.

Other objects and advantages will become apparent from the following description wherein reference is made to the drawings, in which:

Fig. 1 is a top plan view of a mold section with a plurality of the ejectors installed thereon;

Fig. 2 is a fragmentary sectional view taken on the line 2—2 of Fig. 1;

Fig. 3 is an enlarged top plan view of the ejector unit, illustrated in Fig. 1, a portion of the mold being shown therewith for clearness in illustration;

Fig. 4 is a vertical sectional view of a portion of the ejector unit and of the mold and is taken on the line 4—4 of Fig. 3; and Fig. 5 is a sectional view taken on the line 5—5 of Fig. 4.

Referring to the drawings, the mold, indicated generally at 1, is one such as shown and described in my copending application Serial No. 102,869, filed July 2, 1949, and which, in so far as concerns the present invention, briefly comprises an outer lower chase 2 in which is a mold cavity plate 3. Beneath the plate 3, which is relatively thin, is a steam plate 4, which preferably is copper beryllium alloy. The steam passages of the plate 4 are in the form of a steel tube 5 having an inlet end 6 and a discharge end 7, the tube preferably being embedded in the plate 4 by casting the copper beryllium alloy thereabout. The mold plate 3 containing the lower cavity portion of the mold and the steam plate 4 are insulated from the chase 2, preferably by a strip of stainless steel 8 which, if desired, may be laminated. The insulating effect is obtained largely due to the fact that the copper beryllium alloy has a high degree of thermal conductivity relative to stainless steel and the air gaps necessarily present between two engaged pieces of metal.

Also mounted within the mold is a means for admitting air under pressure to the ejectors to be described. In this particular form of mold, this means is preferably accomplished by casting in the steam plate steel tubes 9 which connect with cavities 10 formed in the steam plate 4 and are capable of withstanding relatively high pressures. The bottoms of the cavities 10 may be sealed by suitable plates, as shown, or by the insulator 8. A pipe line including a valve 11 is connected to the tubes 9. The valve 11 is operative in one position to connect the tubes 9 to a source of air under pressure and disconnect them from the atmosphere so that pneumatic pressure may be supplied to the cavities 10. In another position, the valve 11 is operative to disconnect the tubes 9 from the source of pneumatic pressure and to connect them to the atmosphere, thus venting the cavities 10 to the atmosphere.

Referring next to the ejector unit, in the form illustrated four units are provided in the mold and indicated generally at 11a. As illustrated in Fig. 4, each unit is adapted to be removed through the cavity of the mold. For this purpose the mold plate is provided with a suitable internally threaded collar 12 which is securely fastened therein and remains as a permanent part of the mold except when it is necessary for it to be replaced because of damage. The ejector unit itself comprises a cap 13 which is adapted to be received in the collar 12, the cap being provided with a suitable annular shoulder 14 adapted to seat on a corresponding shoulder in the collar 12. The cap 13 is provided with a passage in the form of an axial bore 15 which opens at its upper end into the mold cavity.

Detachably secured to the cap 13 is an air cylinder 16 which preferably is coaxial with the bore 15. The mold is provided with a passage 17 which preferably is coaxial with the bore 15. In the form illustrated wherein the plate 3 and the steam plate 4 are separate, this passage is located in the plate 4 and opens at its lower end into the cavity 10. The cylinder 16 is of slightly less diameter than the passage 17 so that it may be inserted thereinto readily. The assembled unit is installed by screwing the cap 13 into position in the collar 12. If desired, a packing gland 18 may be provided between the steam plate 4 on the one hand and the collar 12 and lower end of the cap 13 on the other. Thus a passage is provided in the mold which connects the mold cavity with the cylinder.

The cylinder 16 is preferably of greater internal diameter than the bore 15. Within the cylinder is mounted an ejector means comprising an ejector pin or portion 19 and a piston or operating portion 20, the piston 20 being fixedly secured to the pin 19 so that the two are movable as a unit axially of the cylinder 16 and bore 15, respectively. The cylinder 16 is provided at its lower end, or at the side opposite from the ejector portion 19 of the ejector means with one or more inlet ducts 21 which, when the unit is installed in the mold, connect the inside of the cylinder with the cavity 10. The ejector pin or portion 19 is reciprocable in the bore 15 from a retracted position in which only its upper end is exposed in the mold cavity to an ejecting position in which the upper end protrudes into the cavity 22.

The ejector means is moved on its ejection stroke by air under pressure introduced through the ducts 21. A return spring 23 is provided for restoring the ejector means to its retracted position. The ejector means thus far described is operative for mechanically engaging and lifting the molded article from the mold cavity. However, it is desirable that the article be lifted not only by the direct mechanical engagement of the upper end of the ejector portion 19 with the article but also by pneumatic pressure introduced into that space between the article and the cavity wall which is adjacent the ejector pin 19 and results from the slight initial lifting of the article. In order to obtain this result, a passage is provided which connects the mold cavity adjacent the end of the ejector pin 19 and with the source of pneumatic pressure. In the form illustrated a passage 24 for this purpose may be provided between the ejector pin 19 and the wall of the bore 15. This is accomplished by providing one or more flattened areas on the ejector pin 19, these areas extending longitudinally of the ejector 19 from the upper end a sufficient distance toward the opposite end of the ejector pin to maintain the connecting passage during movement of the ejector pin from retracted to ejecting position. Obviously, if desired, the result can be obtained by providing flattened areas on or channels in the wall of the bore 15.

In order to admit air from the source to the passage 24 the ejector means is provided with a by-pass which connects with the cylinder cavity at opposite sides of the piston 20 so that air entering the cylinder from the ducts 21 can pass through the by-pass and the passages 24. In the form illustrated the by-pass is obtained by providing ducts 26 and 27 in the pin portion 19 although obviously such ducts could be provided in the walls of the cylinder if desired, the important feature being that upon initial movement of the ejector pin on its ejecting stroke or shortly after, the air under pressure is admitted to the passages 24. In the form illustrated, the piston 20 operates due to the differential in total pressure exerted by the air pressure on the bottom area of the piston and that exerted on the relatively smaller top area. This differential is available even though the unit pressure built up in the cylinder above the piston portion is equal to the unit pressure therebeneath.

The by-pass passage 24 is so limited in size and shape that it permits the entrance of air into the cavity but prevents the escape of the plastic material therethrough from the cavity. For example, the flattened areas provided on the ejector portion may be about .003 of an inch deep.

Thus the air is introduced into the mold cavity through the passage 24 adjacent the point of contact of the ejector with the article molded upon initial lifting of the article by the ejector and spreads and delivers uniform pressure to the underside of the article over a progressively increasing area. This eliminates strains during ejection of the large thin article. Likewise the passage 24 acts as a vent for evolved gases when the ejector is in retracted position, the gases escaping by way of the passage 24, the by-pass in the ejector means, the cavities 10, ducts 9, and external piping and valve 11. Obviously the same ejecting operations can be accomplished by providing, instead of the passages 24, suitable ducts in the cap 13 or in the ejector 19 but such ducts at the cavity ends should be offset from that part of the ejector which actually mechanically engages the article. For ejection air is admitted under pressure from about 60 to 90 pounds per square inch and acts to raise the piston to its full distance of travel.

In the form illustrated the article to be molded is one having ribs on its rear face which is the surface presented to the ejectors. Since these ribs cross the portion of the mold the cap 13 which forms part of the mold, the cap 13 is provided with grooves 30 which are continuations of grooves 31 formed in the remainder of the mold cavity. The cap 13 is installed in the mold before the formation of the grooves 30 and after installation the grooves 30 are formed in the cap so that they will fit in the exact location required when the cap is subsequently removed and reinstalled. The grooves 30 afford a suitable gripping surface for engagement with a T-wrench for removal of the cap 13 in event replacement of the cap or the ejector and cylinder mechonisms must be replaced.

In those instances in which, for extraneous reasons, it is desirable to forego the advantage of installing the ejector unit through the cavity of the mold, the cap 13 may be omitted and the bore 15 and passage 17 formed directly in the metal mass of which the mold plate is composed, and the wall of the passage 17 tapped to provide the necessary threads for receiving the upper threaded end of the cylinder. Obviously, if desired, the cylinder and piston may be positioned farther from the mold cavity and the ejector pin 19 lengthened so as to provide substantially the same operative effect.

If liquid, instead of air, is used as the pressure fluid, the valve 11 is arranged to connect the tubes 9 to the source of liquid under pressure and disconnect them from a suitable sump in one position of the valve and to disconnect them from the source of liquid under pressure and connect them to the sump in another position of the valve, the sump or line leading thereto preferably being vented to the atmosphere to permit the escape of evolved gases which enter the tubes 9 from the mold cavity.

In the claims, the word "air" is meant to include liquid or other gases in addition to air, and the word "atmosphere" is meant to include a suitable sump as well as the atmosphere.

Having thus described my invention, I claim:

1. A mold having a forming cavity and a passage opening thereinto, a fluid pressure cylinder carried by the mold, ejector means including an ejector portion reciprocable in the passage and a piston portion in the cylinder and operative by air pressure to move the ejector portion from a retracted position in the passage to an ejecting position in which the ejector portion protrudes into the cavity, valve means operable selectively to connect the cylinder at one side of the piston portion to a source of air for moving the ejector portion on its ejecting stroke and to disconnect the cylinder from said source at said one side of the piston and connect it with the atmosphere, return means operative to return the ejector means to retracted position when the cylinder is disconnected from said source, and continuously open duct means between said one side of the piston and said mold cavity adjacent said passage and operative to admit air under pressure from said source through said valve means and cylinder into the mold cavity adjacent that surface portion of an article in the cavity which is engaged by said ejector portion when the ejector means is moved on its ejecting stroke, and to vent gases from the mold cavity through the valve means and cylinder when the valve means is operative to connect the cylinder with the atmosphere.

2. A mold having a forming cavity and a passage opening thereinto, a fluid pressure cylinder carried by the mold, ejector means including an ejector portion reciprocable in the passage and a piston portion in the cylinder operative by air pressure to move the ejector portion from a retracted position in the passage to an ejecting position in which the ejector portion protrudes into the cavity, valve means operable selectively to connect the cylinder at one side of the piston portion to a source of air for moving the ejector portion on its ejecting stroke and to disconnect the cylinder at said one side of the piston portion from said source and connect it with the atmosphere, return means operative to return the ejector means to retracted position when the cylinder is disconnected from said source, and continuously open duct means between said one side of the piston and said cavity adjacent to said ejector portion operative to admit air under pressure from said source through said valve into the mold cavity adjacent that surface portion of an article in the cavity which is engaged by said ejector portion when the ejector means is being moved on its ejecting stroke, said duct means being sufficiently small to prevent escape of moldable material from the cavity therethrough and sufficiently large to permit the escape of gases from the cavity at a location near the ejector portion through said valve when the cylinder is disconnected from the source.

3. A mold having a cavity and a portion with a passage leading into the cavity, a fluid pressure cylinder aligned with the passage, an ejector means having an ejector portion reciprocable in the passage and a piston portion reciprocable in the cylinder, said cylinder having an inlet opening thereinto at the side of the piston opposite from the ejector, said ejector means having a continuously open by-pass duct connecting with the bore of the cylinder at opposite sides of the piston, one of said portions having means providing a continuously open by-pass duct connecting the cylinder at the side of the ejector portion with the cavity at a location near the ejector portion, valve means operable in one position to connect the cylinder inlet with a source of fluid pressure and in another position to disconnect the cylinder from said source and connect it with the atmosphere, and return means for returning the ejector means to starting position when the valve means is in said other position.

4. A mold having a cavity and a passage leading thereinto, an ejector movable in the passage to and from ejecting position, pneumatically responsive means operable to move the ejector to ejecting position upon connection of the pneumatic responsive means to a source of air under pressure thereto, return means for returning the ejector from said position upon disconnection of the pneumatically responsive means from the source and connection thereof with the atmosphere, means providing a continuously open air passage interconnecting the pneumatically responsive means and cavity in the portion of the cavity adjacent that surface of the article molded therein which is engaged by the ejector and operable to admit air under pressure from the pneumatically responsive means to said portion, and means for selectively connecting the pneumatically responsive means to said source, and for disconnecting it from said source and connecting it to the atmosphere.

5. An ejector unit for molds comprising a body adapted to be secured to a mold, and having a passage open to the atmosphere at one end, a cylinder carried by the body and connecting with the other end of the passage and having an inlet port spaced from the passage, a piston in the cylinder between the passage and port, an ejector reciprocable in the passage and operatively connected to the piston and adapted when pressure fluid is admitted to the cylinder through said port to be moved by the piston on its ejecting stroke, returns means for the piston and ejector, said unit having a continuously open by-pass duct connecting with the cylinder bore at opposite sides of the piston, and said body and ejector having a continuously open passage therebetween leading from the cylinder at the side of the piston opposite from said port and to said one end of the first passage.

6. An ejector unit for molds comprising a body adapted to be secured in a mold and having a passage therein open at one end, a cylinder carried by the body in coaxial relation to and connected with said passage, said cylinder having an inlet port spaced from the passage, ejector means having an ejector portion reciprocable in said passage and adapted to protrude from the end of said passage in ejecting position and to be retracted into said passage in non-ejecting position, said ejector means having a piston portion connected to the ejector portion and received in the cylinder and operative to move the ejector portion into ejecting position upon connection of said inlet port with a source of air under pressure, return means operative to move the ejector means to non-ejecting position upon connection of said port with the atmosphere, said ejector means having a continuously open by-pass connecting with the cylinder bore at opposite sides of the piston portion, and said ejector portion having a flattened area defining with the wall of said passage, a continuously open passage for air into the cavity from the portion of the cylinder bore which is on the opposite side of the piston from said port, said last passage being sufficiently restricted to prevent the escape of plastic material therethrough from the mold cavity when the material is under molding pressure in the cavity.

7. A mold having a pressure fluid conduit therein and a cavity, a passage leading from the cavity and connected to the conduit in spaced relation to the end of the cavity, a pneumatically operated ejector unit in the passage and insertable therein and withdrawable therefrom at the cavity end of the passage, said unit including a pneumatic cylinder member, a piston reciprocable therein, a cap member connected to the cylinder member and closing one end thereof and having a bore coaxial with and connected at one of its ends with the bore of the cylinder and open at its other end through the outer end wall of the cap member, an ejector on the piston and reciprocable in the bore, a portion of the outer end wall of the cap member providing a portion of the cavity wall, one of said members having an externally threaded portion and the wall of said passage having a complementary internally threaded portion, said unit being detachably connected to said mold by interengagement of said threaded portions and being manipulatable for detachment from the end of the unit exposed in the mold, said cylinder member being accommodated in the passage and having a port opening into the passage and arranged so as to admit fluid pressure from the passage into the cylinder so as to move the piston on the ejecting stroke.

8. A structure according to claim 7 characterized in that the cap member has said externally threaded portion and said externally threaded portion is of greater diameter than the external diameter of the cylinder and said passage has an enlarged counterbore at the cavity end and the cap member has a flange fitting said counterbore.

NEUMANN L. MAHLA.

REFERENCES CITED

The following references are of record in the file of this patent:

UNITED STATES PATENTS

| Number | Name | Date |
| --- | --- | --- |
| 2,314,823 | Gora | Mar. 23, 1943 |
| 2,356,406 | Hislop | Aug. 22, 1944 |
| 2,396,406 | Anderson | Mar. 12, 1946 |

OTHER REFERENCES

"Loading the Injection Mold," Don F. Hoffman, Tool and Die Journal, November 1942.